United States Patent [19]

Swink et al.

[11] Patent Number: 4,722,367
[45] Date of Patent: Feb. 2, 1988

[54] MODULAR VORTEX SPOILER SYSTEM FOR PIPELINES

[75] Inventors: Marvin N. Swink, Costa Mesa; Robert B. Schultz, Rollings Hills Estates; James O. Towery, Costa Mesa, all of Calif.

[73] Assignee: Atlantic Richfield Company, Los Angeles, Calif.

[21] Appl. No.: 71,576

[22] Filed: Jul. 9, 1987

Related U.S. Application Data

[63] Continuation of Ser. No. 859,106, May 2, 1986, abandoned.

[51] Int. Cl.⁴ .............................................. F16L 57/00
[52] U.S. Cl. .................................... 138/178; 138/106; 138/122; 138/173; 138/144
[58] Field of Search ............... 138/103, 106, 107, 110, 138/122, 173, 144, 149, 129, 178; 52/84, 737

[56] References Cited

U.S. PATENT DOCUMENTS 1,977,775  10/1934  Patterson ............................. 138/110
3,076,533  2/1963   Scruton et al. ..................... 73/147 X
3,454,051  7/1969   Goepfert et al. ............... 138/178 X
4,059,129  4/1977   Feiz ................................. 138/178 X
4,067,362  1/1978   Jackman ............................. 138/173

FOREIGN PATENT DOCUMENTS 526483  2/1954  Belgium ............................. 138/107

Primary Examiner—James E. Bryant, III
Attorney, Agent, or Firm—Michael E. Martin

[57] ABSTRACT

A pipeline vortex spoiler system comprising elongated foamed plastic strakes which are formed in sections approximately fifteen to twenty feet in length and have a somewhat inverted T-shaped cross sectional configuration. The strakes are disposed on the exterior surface of a cylindrical pipeline or the like to form a spiral or helical path and are secured to the pipeline section by flexible cylindrical bands or straps. The strake sections are adaptable to use on pipeline sections and other cylindrical bodies having a wide range of diameters, and are easily stored, shipped and attached to pipelines and similar bluff body structures in the field.

7 Claims, 7 Drawing Figures

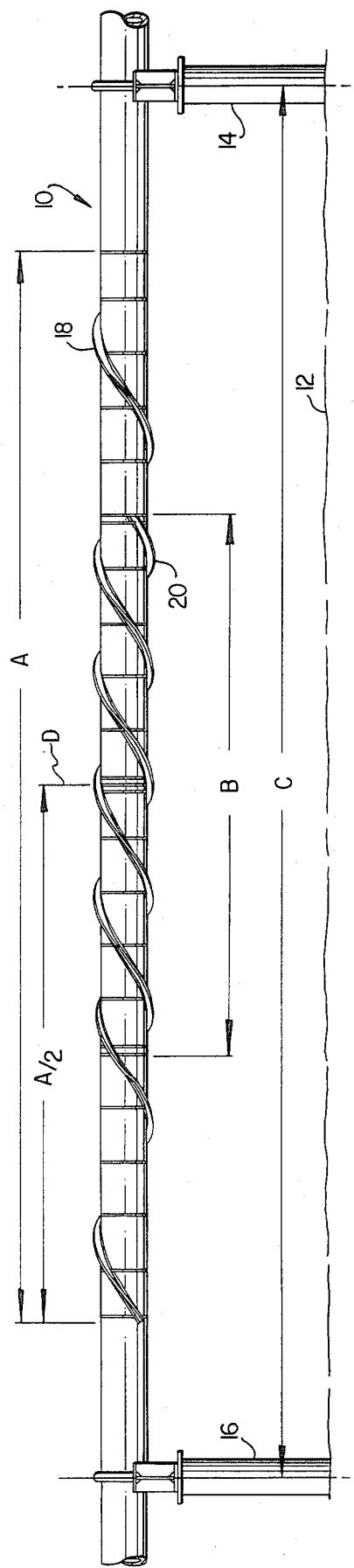
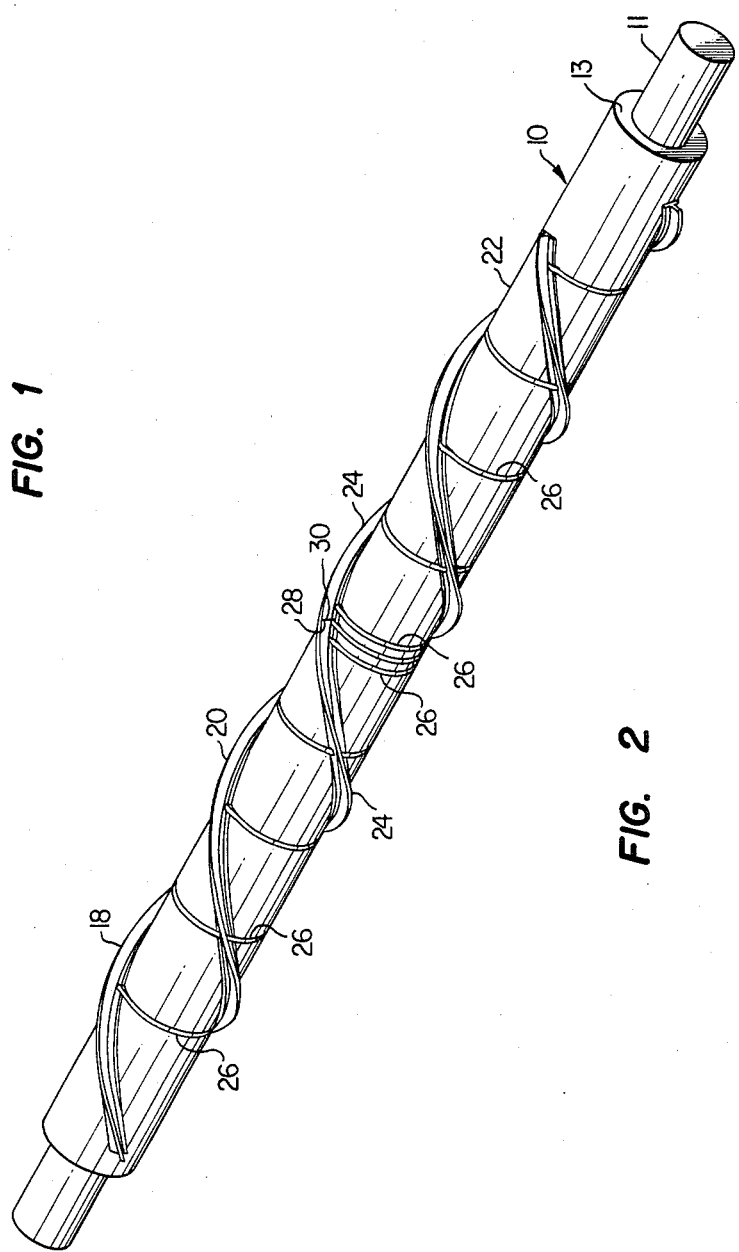
FIG. 1
FIG. 2

MODULAR VORTEX SPOILER SYSTEM FOR PIPELINES

This application is a continuation of application Ser. No. 859,106, filed May 2, 1986, now abandoned.

FIELD OF THE INVENTION

The present invention pertains to a system of helical rib or strake type vortex spoilers for installation on suspended pipelines and similar cylindrical bodies of various diameters.

BACKGROUND

Suspended pipelines and other elongated rather slender bluff bodies are susceptible to the development of von Karman vortex streets and the resultant vibrations which may be induced by this vortex shedding phenomenon. Vortex shedding from suspended pipeline sections and similar cylindrical structures may be overcome by strengthening the pipe to change the natural frequency of the suspended section, providing more closely spaced supports or varying the support spacing. Alternatively, vortex breakers or spoilers may be provided in the form of helical ribs or strakes such as disclosed in U.S. Pat. No. 3,076,533 to C. Scruton and D. E. J. Walshe. Although the Scruton, et al, patent suggests the provision of helical rib-type vortex spoilers, the application of this type of spoiler to suspended pipelines presents certain problems, the solutions to which have eluded art workers prior to the development of the present invention.

For example, the installation of pipelines in remote regions and of various diameters, including those which are covered with insulating material, make it inconvenient or impossible to install conventional metal or preformed helical rib-type vortex spoilers. Accordingly, there has been a longfelt need to develop a type of vortex spoiler of the general type discussed hereinabove which may be easily attached to suspended pipelines after installation of the pipeline, may be readily adaptable to pipelines of different diameters, may be easily shipped to remote worksites for installation and is also relatively inexpensive to fabricate and install. These desiderata have not been provided by the configurations of vortex spoilers in the prior art. However, with a development of the present invention, substantially all of the improvements sought have been met with a surprisingly inexpensive and easily installed vortex spoiler system.

SUMMARY OF THE INVENTION

The present invention provides an improved modular vortex spoiler system for use on suspended pipelines and other long, slender cylindrical bodies.

In accordance with an important aspect of the present invention, helical rib or strake type vortex spoilers are provided in modular sections and are made of a flexible plastic foam-type material whereby continuous or intermittent helical strakes may be formed by wrapping the vortex spoiler sections around a length of pipeline to be dampened. The flexible strake sections are easily secured to the pipeline after installation thereof and/or after installation of an insulating outer jacket or cover over the pipe itself.

In accordance with another important aspect of the present invention, vortex spoiler strakes are provided in modular form which may be attached to a cylindrical body such as a pipeline by a conventional strapping procedure. The vortex spoiler strakes are constructed of a relatively lightweight, low density plastic material which may be easily conformed to the outer surface of the pipeline and easily attached thereto by the use of a reinforcing member which prevents deformation or breakage of the spoiler strake at the point of attachment.

In accordance with yet another important aspect of the present invention, a vortex spoiler strake is provided which is of a unique cross sectional configuration which provides a stable member which is easily attached to a cylindrical surface and which is easy to fabricate. The configuration of the vortex spoiler strake and its composition provide improved application of vortex spoilers to elongated cylindrical bodies, in particular suspended pipeline sections, wherein single wrap or multiple wrap strakes may be applied at predetermined points along a pipeline section between suspension or support points.

The abovementioned features and advantages of the present invention, together with other superior aspects thereof, will be further appreciated by those skilled in the art upon reading the following detailed description in conjunction with the drawing.

BRIEF DESCRIPTION OF THE DRAWING

FIG. 1 is a side elevation of a section of suspended pipeline including the modular vortex spoiler system of the present invention applied thereon;

FIG. 2 is a perspective view of a portion of a section of pipeline illustrated in FIG. 1;

DESCRIPTION OF A PREFERRED EMBODIMENT

Figure 3:
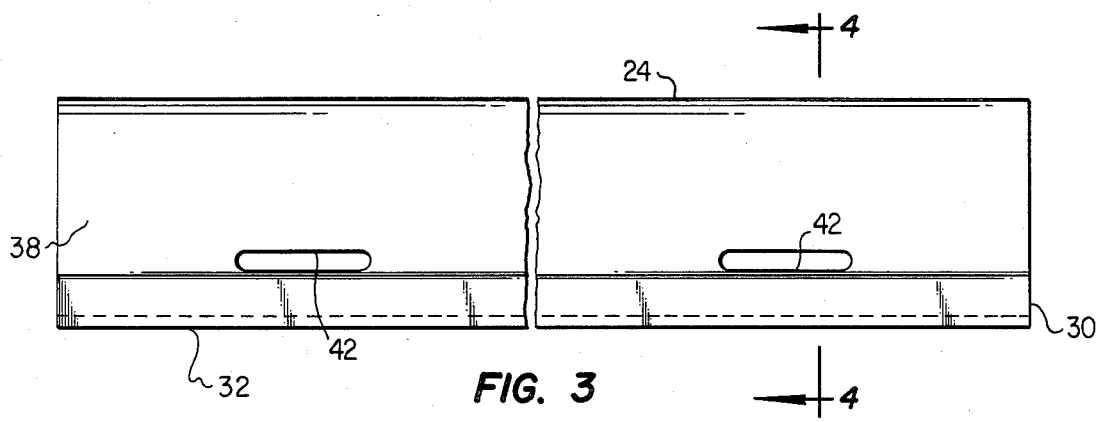
FIG. 3 is a side elevation of the improved vortex spoiler strake.

In the description which follows, like parts are marked throughout the specification and drawing with the same reference numerals, respectively. The drawing figures are not necessarily to scale and certain features of the invention may be shown exaggerated in scale in the interest of clarity and conciseness.

Referring to FIG. 1 there is illustrated a section of fluid transmission pipeline, generally designated by the numeral 10, which is disposed above the earth's surface 12 and suspended between spaced apart supports 14 and 16. In many applications of fluid transmission pipelines and the like, it is necessary to suspend or support the pipeline above ground. Arctic crude oil pipelines, for example, must be extended above the earth's surface due to the delicate condition of the terrain. These pipelines are exposed to the severe climate including sustained high velocity winds, and unwanted structural oscillation of the pipeline due to the formation of von Karman vortex streets must be prevented. The aforementioned types of pipelines range in diameter from six inches to more than thirty inches and in many instances are covered with a layer of insulation having a somewhat rigid outer protective jacket. Accordingly, in the construction of these pipelines, it is highly desirable to provide vortex spoiler or breaker devices which are readily adaptable to various pipeline diameters, may be easily attached to the outer surface of the pipeline regardless of the type of material of that surface and can be readily adjusted as regards the configuration of the spoiler. For example, the pipeline section 10 illustrated in FIG. 1 is of nominal diameter of about 10.0 inches and has an outer jacket diameter of approximately 16.0 inches. The span between the supports 14 and 16 may range from about 45.0 ft. to 115.0 ft. and the formation of von Karman vortex streets should be prevented at least over 50% to 60% of the pipeline span and extending in both directions from the midpoint between supports. For example, for a span C of 55.0 ft. it is desirable to provide a helical strake or rib-type vortex spoiler 18 which extends at least approximately 15 ft. from either side of the midpoint D between the supports 14 and 16 or a total of 30.0 ft. (distance A). For certain pipelines having a larger diameter it is preferable to add one or more additional helical strake-type vortex spoilers in accordance with the present invention as illustrated in FIGS. 1 and 2 and generally designated by the numeral 20. The second strake 20 typically should extend over approximately 20% to 25% (distance B) of the span between supports 14 and 16 and extending equally on opposite sides of the midpoint D, for example. Moreover, single or multiple lead strakes may be disposed at selected intervals along the span between supports. For example, multiple strakes may be spaced along the pipeline such that the start or lead of each strake is uniformly spaced along the length of the pipeline.

Referring now to FIG. 2, the pipeline section 10 includes an inner steel or aluminum tubular conduit 11, a layer of insulation 13 and an outer jacket 22 which may be a relatively thin metal sleeve. The layer of insulation 13 may be fiberglass mat, polyurethane foam or similar insulating material and the outer sleeve 22 serves primarily as a protective cover and is structurally much less rigid than the inner conduit 11. In this respect, it has previously been difficult and expensive to provide any form of vortex spoiler which can be conveniently attached to the outer surface of the jacket 22 as well as attached to portions of noninsulated pipelines which are more rigid. The strakes 18 and 20 are preferably made up of strake sections 24 which are laid end to end in a helical path on the surface of the jacket 22 and are attached thereto by spaced apart flexible bands 26. At least two of the strake sections 24 making up the strake 18 are shown butted together at the centerline D and are secured to the pipeline section 10 by flexible circumferential bands 26 adjacent the respective ends 28 and 30 of the strake sections.

Figure 4:
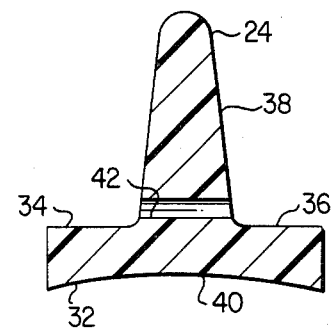
FIG. 4 is a section view taken substantially along the line 4—4 of FIG. 3.

Referring now to FIGS. 3 and 4, the strake sections 24 are each preferably characterized by elongated members made of a flexible material such as foamed polyurethane plastic. The strake sections 24 preferably have an inverted T-shaped cross sectional configuration as illustrated in FIG. 4. The strake sections 24 are characterized by a base portion 32 having opposed flanges 34 and 36 and a central upstanding web 38. The base portion 32 preferably is formed with a concave surface 40 to facilitate conformance of the base portion 32 with the surface of the pipeline or insulating jacket such as the jacket 22. In this way, the strake sections 24 fit snugly against the surface of the pipeline or its covering to minimize the chance of wind flow induced vibrations from lifting or otherwise affecting the strake sections when they are disposed on a cylindrical surface in their working position. As shown in FIG. 3, the strake sections 24 are each provided with spaced apart elongated slots 42 which extend transversely through the web 38 at predetermined intervals.

In a preferred embodiment, the strake sections 24 are manufactured from a foam type molded plastic such as a relatively low density polyurethane foam having a nominal free rise density of approximately 6.5 pounds per cubic foot and a tensile strength in the range of approximately 12 psi at 75° F. to 75 psi at −50° F. The nominal dimensions of strake sections suitable for pipelines having outer cylindrical envelope diameters of from about 12.0 inches to 36.0 inches are such that the base portion 32 is approximately 3.0 inches wide and the overall height of the strake section is also approximately 3.0 inches with a nominal thickness of the web portion 38 of about 1.25 inches. The slots 42 are preferably disposed on 2.0 ft. centers for nominal lengths of the strake sections 24 of 20.0 ft., with the exception of the end slots being positioned with their centers approximately 2.50 inches from the opposite ends 28 and 30 of the strake sections, respectively.

Figure 5:
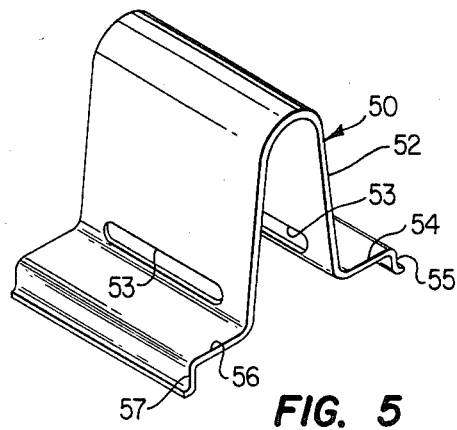
FIG. 5 is a perspective view of a reinforcing member for use in attaching the spoiler strake to a cylindrical body.

Since the strake sections 24 are advantageously made of a low density flexible material such as polyurethane foam, they are preferably reinforced at the slots 42 by a removable metal reinforcing clip member 50 as illustrated in FIG. 5. The clip 50 has generally the cross sectional configuration of the strake sections 24 with a generally inverted U-shaped body portion 52 and opposed flanges 54 and 56 extending from the respective legs of the body portion. The flanges 54 and 56 have downturned distal end portions 55 and 57, respectively. The opposed legs of the U-shaped body portion 52 are also provided with elongated slots 53 which are adapted to be aligned with the slots 42 in the strake sections 24 so that the straps or bands 26 may be threaded through the respective slots for securing the strake sections to the cylindrical outer surface of the pipeline such as the surface of the jacket 22. Thanks to the provision of the support clips 50, the strake sections 24 may be tightly secured to the pipe outer surface or jacket 22 without deforming the base 32. Moreover, the support clips 50 provide for distributing the forces acting on the strake sections, such as the forces exerted by wind flowing over the pipeline section 10 to minimize the unit stress exerted on the strake sections in their working positions.

Figure 6:
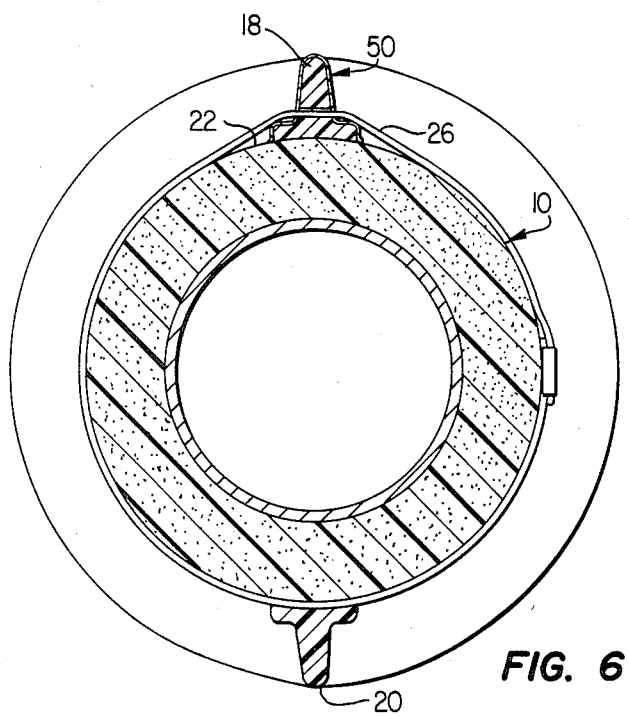
FIG. 6 is a transverse section view showing a preferred method of attachment of the vortex spoiler strakes to a pipeline or similar cylindrical body.

Referring briefly to FIG. 6, the strakes or ribs 18 and 20 are shown in place on the pipeline section 10 and secured to the outer surface of the jacket 22 by the elongated flexible straps 26. The straps 26 are threaded through the slots 53 in the support clips 50 and through the slots 42 in the respective strake sections 24 and are tensioned to secure the strake sections in their working positions. The straps 26 may be formed of a suitable plastic or metal composition and, for example, the straps provided at the opposed end slots 42 of each strake section 24 may be formed of stainless steel while the remaining straps used to secure the strake sections 24 to a pipeline section may be of less expensive plastic material. The straps 26 are preferably secured around the cylindrical surface of a pipeline such as the surface of the jacket 22 utilizing a conventional strapping or banding tool such as a type made under the trademark BAND-IT by Houdaille Industries, Inc.

Figure 7:
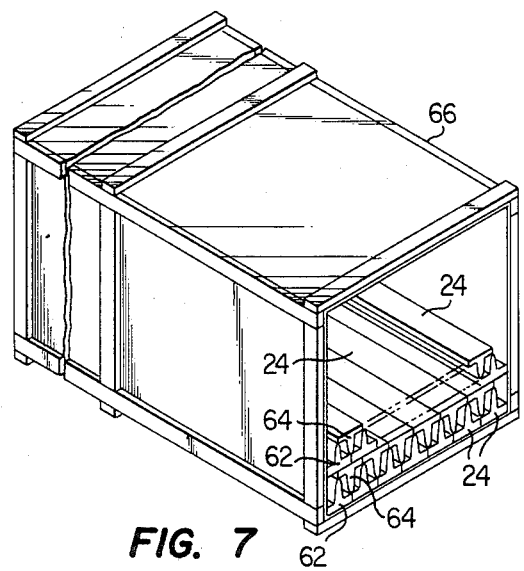
FIG. 7 is a perspective view of an arrangement for crating and shipping the spoiler strakes of the present invention.

The molded foamed plastic vortex spoiler strake sections 24 may be conveniently applied to cylindrical pipelines as well as certain other bodies having a bluff cross sectional configuration and which might be adversely affected by the formation of von Karman vortex streets. The strake sections 24 may be conveniently packaged for shipment as illustrated in FIG. 7 where alternate rows 62 and 64 of strakes sections 24 may be stacked in space-saving relationship in conventional crating 66.

The modular flexible construction of the strake sections 24 provides for varying the helical pitch of the strakes or ribs 18 and 20 in accordance with any selected criteria. According to the abovementioned patent to Scruton et al, spoiler pitches in the range of approximately 5.0 to 15.0 times the diameter of the cylindrical body on which the strakes are supported is an acceptable range for effectiveness of the strakes as vortex spoilers. In the particular application of the strake sections 24 to form the strakes 18 and 20 a single lead strake 18 extends over about 60% of the pipeline section 10 between the supports 14 and 16 and a second strake 20 is added which extends over 25% of the span of the pipeline section 10 and equally on each side of the midpoint of the span. The pitch of the strakes 18 and 20 is preferably about 6.0 times the diameter of the jacket 22 and a multiple lead arrangement such as provided by the helical strakes 18 and 20, in combination, is particularly effective for alleviating the formation of von Karman vortex streets. In view of the flexibility of the application of the strake sections 24 to the outer surface of a pipeline or other cylindrical body any conventional measurement technique may be used to provide the helical path of the strakes. An absolute constant helix angle throughout the length of a strake is not considered necessary and the spacing of a multiple lead strake arrangement, in particular, may be provided by a spacing tool, not shown, made up of opposed templates having a cross sectional configuration similar to the cross sectional shape of the strakes themselves, said templates being interconnected by a flexible strap and buckle arrangement so that the positioning device may be mounted on the pipeline section 10 and used to align the respective strakes 18 and 20 with respect to each other and the slid along the pipeline section to maintain the proper spacing as the straps 26 are applied to the surface of the pipeline or outer jacket.

Although a preferred embodiment of the present invention has been described herein in detail, those skilled in the art will recognize that various substitutions and modifications may be made to the specific embodiment described without departing from the scope and spirit of the invention as recited in the appended claims.

What we claim is:

1. A vortex spoiler device for attachment to the exterior surface of a cylindrical pipeline section, said vortex spoiler device comprising in combination:

a plurality of end-to-end extending elongated flexible plastic strake sections adapted to be connected to the exterior surface of a pipeline section and to extend in a substantially helical path around said exterior surface of said pipeline section, each of said strake sections having a cross sectional configuration characterized by a transversely extending base portion and an upstanding web, each of said strake sections being further characterized by having on its exterior surface means to minimize the formation of von Karmen vortex streets and spaced apart slots extending through said web; and a plurality of elongated flexible straps extending, respectively, through said slots adapted to surround the circumference of a pipeline section for securing said strake sections to the exterior surface of said pipeline section to minimize the formation of von Karman vortex streets in response to the flow of fluid generally transversely with respect to a longitudinal central axis of said pipeline section.

2. The vortex spoiler device set forth in claim 1 including:

a plurality of substantially rigid support members fitted over and engaged with said strake sections at said slots, respectively, said support members being of a rigid material for reinforcing said strake sections at said slots, said support members engaging said straps, respectively, for distributing anchoring forces exerted on said strake sections by said straps.

3. A vortex spoiler device for attachment to a suspended cylindrical pipeline section, said vortex spoiler device comprising in combination:

at least one elongated helical strake having on its exterior surface means to minimize the formation of von Karman vortex streets and adapted to extend radially from the exterior surface of a pipeline section, said strake comprising an elongated flexible non metallic strake member adapted to be wrapped around the exterior surface of said pipeline section to form helical convolutions and said strake member including spaced apart means on said strake member for receiving anchor means for said strake member for securing said strake member to said pipeline section; and anchor means comprising a plurality of elongated flexible straps extendable around said pipeline section at spaced apart intervals and operably engaged with said strake member for securing said strake member to the exterior surface of said pipeline section to minimize the formation of von Karman vortex streets.

4. The vortex spoiler device set forth in claim 3 wherein:

said strake member is made up of plural strake sections extending end to end in abutting relationship.

5. The vortex spoiler device set forth in claim 4 wherein:

said strake sections are formed of flexible foamed plastic.

6. The vortex spoiler device set forth in claim 5 wherein:

said strake sections have a cross-sectional configuration characterized by a generally transverse base portion and an upstanding web extending from said base portion generally radially outward from the central axis of said pipeline section when said strake sections are secured thereto.

7. The vortex spoiler device set forth in claim 6 wherein:

said base portion has a concave curved surface for engagement with the exterior surface of said pipeline section.

* * * * *